May 14, 1935.  F. L. HAUSHALTER  2,001,573
FLUID SEALING EXPANSION JOINT
Filed Aug. 31, 1934
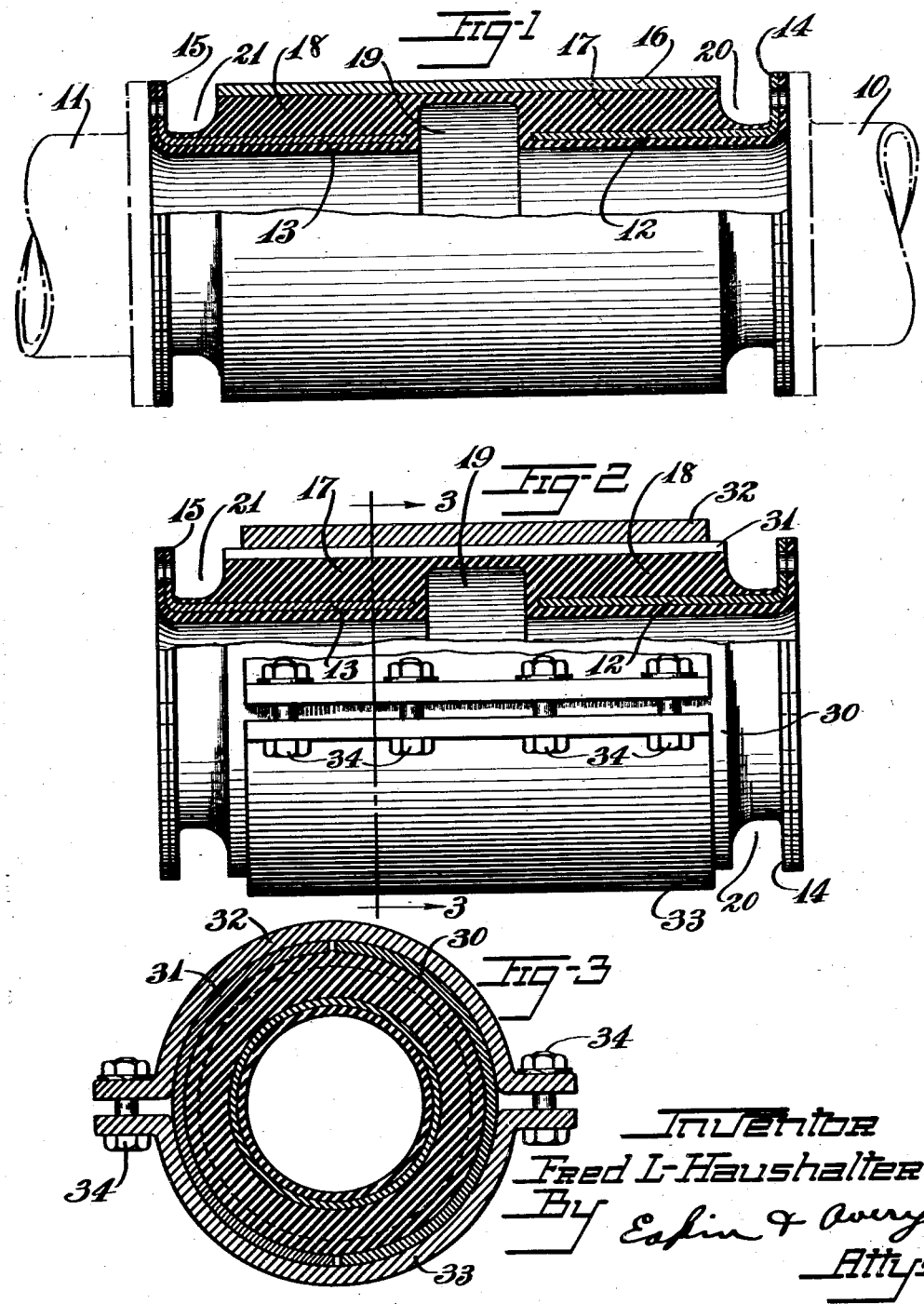
Inventor
Fred L. Haushalter
By Eakin & Avery
Attys.

Patented May 14, 1935

2,001,573

UNITED STATES PATENT OFFICE 2,001,573

FLUID SEALING EXPANSION JOINT

Fred L. Haushalter, Akron, Ohio, assignor to The B. F. Goodrich Company, New York, N. Y., a corporation of New York Application August 31, 1934, Serial No. 742,249

10 Claims. (Cl. 285—90)

This invention relates to fluid-sealing expansion joints, and has for its chief objects to provide an expansion joint of improved construction, to avoid entirely the necessity for any sliding surfaces in the assembly, to permit large relative movement of the pipe members while maintaining an effective seal against high fluid pressures, to provide thorough protection of the metallic parts against the action of conducted corrosive fluids, and to provide for convenience in the manufacturing and assembly operations.

These and further objects will be apparent from the following description, reference being had to the accompanying drawing, in which:

Fig. 1 is a side elevation, partly in longitudinal section, of a joint assembly constructed according to and embodying the invention in its preferred form.

Fig. 2 is a view like Fig. 1 but showing a modified construction.

Fig. 3 is a section taken at the line 3—3 of Fig. 2.

In Fig. 1, two spaced-apart pipe ends 10, 11, which may be subject to relative lengthwise movement, or even relative angular movement, because of soil movements, temperature changes, vibrations, etc., are connected by a joint of the improved construction. Disposed between the pipe ends and secured to them, respectively, are two axially-extending inner sleeve members 12 and 13, of any suitably rigid material, such as metal, which are spaced apart at their inner ends to permit relative axial movement. These members preferably are formed with radially extending end flanges 14 and 15 for the attachment to the pipe members.

Over a considerable axial extent of the inner sleeves the latter are enclosed by an outer sleeve 16, which, desirably, may be of no greater outside diameter than that of the pipe flanges, for the sake of compactness. The ends of the sleeve 16 are axially spaced from the flanges 14 and 15 for free relative movement of the parts. Between the respective inner sleeve members and the outer sleeve are disposed annular rubber bodies 17 and 18 held in fluid-sealing and non-slipping relation to the sleeves, preferably by a vulcanized bond. For corrosion resistance the rubber may extend in a layer over all surfaces exposed to the conducted fluid, as shown. The assembly conveniently may be molded as a single unit in which, in order to permit the desired relative movement of the sleeves, the rubber is molded with an inner annular central groove 19 and outer annular end grooves 20 and 21.

As relative axial movement of the pipe members is resisted substantially entirely by shear stress of the rubber bodies 17 and 18, large movements are permitted without slippage of any contacting surfaces. Considerable angular movement is also permitted without in the least lessening the effectiveness of the seal. Inasmuch as these rubber bodies have a considerable axial extent they are effective to resist strongly fluid pressure against their end surfaces at the inner space 19. In the radial direction the fluid pressure is strongly resisted by the inner and outer sleeves.

For resisting very high fluid pressures the embodiment of Figs. 2 and 3 may be used. Here, the construction is the same as in Fig. 1, except that the outer sleeve structure, instead of being continuous circumferentially, comprises part-cylindrical members 30, 31, which are spaced apart in the unstressed condition of the rubber and are held pressed toward the joint axis in a housing to compress the rubber bodies radially against the inner sleeve members. The housing may comprise flanged part-cylindrical members 32, 33 held together by bolts 34, 34 through the flanges. By tightening these bolts the radial compression of the rubber bodies, and accordingly their strength to resist the fluid pressure in the axial direction, may be increased, while, nevertheless, large relative axial movement of the pipe members is permitted.

The embodiment of Figs. 2 and 3 has the advantage also, in the case where the rubber is vulcanized to the sleeve members, that the separate and spaced apart outer sleeve parts can yield toward each other under the shrinkage strains of the rubber during cooling from the heat of vulcanization so that the bond of the rubber to the sleeve is relieved of such strains and its strength is assuredly maintained.

The joints of the invention can be conveniently manufactured as complete, compact units, and, for assembly in the field, need only be bolted or otherwise attached to the pipe sections to be connected. There being no sliding surfaces or packing that might develop leaks, the improved joint, once properly mounted, requires virtually no maintenance attention.

I claim:

1. A fluid-sealing expansion joint assembly comprising as a structural unit inner and outer sleeve structures arranged telescopically for relative axial movement, respective pipe-attaching elements in association therewith, and a body of rubber filling the radial space between said sleeve structures in fluid-sealing and non-slipping relation thereto and leaving the adjacent ends of the structures axially free and resisting relative axial movement of the sleeve structures by shear stress of the rubber.

2. A fluid-sealing expansion joint assembly as defined in claim 1 in which the pipe attaching element of each sleeve structure comprises a radially extending flange spaced axially from the other sleeve structure.

3. A fluid-sealing expansion joint-assembly as defined in claim 1 in which the outer sleeve structure comprises part-cylindrical sections held inwardly pressed against the rubber body to compress the latter radially against the inner sleeve structure.

4. A fluid-sealing expansion joint assembly comprising as a structural unit inner and outer sleeve structures arranged telescopically for relative axial movement, respective pipe-attaching elements in association therewith, and a body of rubber filling the radial space between said sleeve structures in fluid-sealing and non-slipping relation thereto and leaving the adjacent ends of the structures axially free and resisting relative axial movement of the sleeve structures by shear stress of the rubber, the rubber being vulcanized to at least one of said sleeve structures.

5. A fluid-sealing expansion joint assembly comprising as a structural unit inner and outer sleeve structures arranged telescopically for relative axial movement, respective pipe-attaching elements in association therewith, and a body of rubber filling the radial space between said sleeve structures in fluid-sealing and non-slipping relation thereto and leaving the adjacent ends of the structures axially free and resisting relative axial movement of the sleeve structures by shear stress of the rubber, the rubber being vulcanized to at least one of said sleeve structures and extending in a layer over all the fluid-contacting surfaces of the unit.

6. A fluid-sealing expansion joint assembly comprising as a structural unit a pair of sleeve members relatively movable axially and each having a pipe-attaching portion, a sleeve structure overlapping said sleeve members in radially spaced relation thereto, said sleeve structure being movable axially with relation to said sleeve members, and bodies of rubber radially disposed between the said sleeve structure and sleeve members axially spaced so as to offer minimum resistance to axial movement of the sleeve members, said bodies being held in non-slipping and fluid-sealing relation thereto and resisting relative axial movement of the sleeve members by shear stress of the rubber.

7. A fluid-sealing expansion joint assembly as defined in claim 6 in which the said sleeve members are disposed inwardly of the said sleeve structure and comprise radially extending pipe-attaching flanges in axially spaced relation to the outer sleeve structure.

8. A fluid-sealing expansion joint assembly comprising as a structural unit a pair of sleeve members relatively movable axially and each having a pipe-attaching portion, a sleeve structure overlapping said sleeve members in radially spaced relation thereto, said sleeve structure being movable axially with relation to said sleeve members, and bodies of rubber radially disposed between the said sleeve structure and sleeve members and vulcanized thereto, said bodies being axially spaced so as to offer minimum resistance to axial movement of the sleeve members the arrangement being such that relative axial movement of the sleeve members is resisted by shear stress of the rubber.

9. A fluid-sealing expansion joint as defined in claim 8 in which the rubber extends over all the fluid-contacting surfaces of the unit.

10. A fluid-sealing expansion joint assembly comprising as a structural unit a pair of inner sleeve members relatively movable axially and each having a pipe-attaching flange extending radially outward, an outer sleeve structure axially spaced from said flanges and overlapping said sleeve members, and bodies of rubber disposed between the outer sleeve structure and inner sleeve members in axially spaced relation so as to offer minimum resistance to axial movement of the sleeve members, said bodies being vulcanized to the inner members and being held in fluid-sealing and non-slipping relation to the outer sleeve structure and resisting relative axial movement of said structure and members by shear stress of the rubber.

FRED L. HAUSHALTER.